(12) United States Patent
Grutke et al.

(10) Patent No.: US 6,458,879 B1
(45) Date of Patent: Oct. 1, 2002

(54) THERMOPLASTIC MATERIALS CONTAINING NANOCOMPOSITES AND AN ADDITIONAL ELASTOMER

(75) Inventors: Stefan Grutke; Graham Edmund Mc Kee, both of Neustadt; Christof Mehler, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/831,398

(22) PCT Filed: Nov. 18, 1999

(86) PCT No.: PCT/EP99/08870

§ 371 (c)(1),
(2), (4) Date: May 9, 2001

(87) PCT Pub. No.: WO00/31185

PCT Pub. Date: Jun. 2, 2000

(30) Foreign Application Priority Data

Nov. 24, 1998 (DE) .......................................... 198 54 170

(51) Int. Cl.$^7$ ................................................ C08K 3/34
(52) U.S. Cl. ...................... 524/442; 524/444; 524/445; 523/201
(58) Field of Search .............................. 524/442, 444, 524/445; 523/201

(56) References Cited

U.S. PATENT DOCUMENTS

| 4,221,879 A | 9/1980 | Humme et al. ................. 525/66 |
| 4,739,007 A | 4/1988 | Okada et al. ................. 524/789 |
| 4,816,557 A | 3/1989 | Pipper et al. ................. 528/500 |
| 6,284,830 B1 * | 9/2001 | Gottschalk et al. ......... 524/449 |

FOREIGN PATENT DOCUMENTS

| CA | 1 196 130 | 10/1985 |
| DE | 206 999 | 2/1984 |
| DE | 36 32 865 | 4/1987 |
| DE | 197 42 868 | 4/1999 |
| DE | 197 52 181 | 5/1999 |
| EP | 0 001 245 | 4/1979 |
| EP | 0 083 446 | 7/1983 |
| EP | 0 125 483 | 11/1984 |
| EP | 0 284 968 | 10/1988 |
| EP | 0 352 042 | 1/1990 |
| EP | 0 387 903 | 9/1990 |
| EP | 0 398 551 | 11/1990 |
| WO | WO 93/04117 | 3/1993 |
| WO | WO 93/04118 | 3/1993 |

OTHER PUBLICATIONS

"Encyclopedia of Polymer Science and Engineering" vol. 6, Lovell et al. "Emulsion Polymerization and Emulsion Polymers" (1997) Gätcher et al. "Taschenbuch der Kunststoff–Additive" (1983) pp. 483–519 Benzing et al. "Band 160 Kontakt & Studium" (1988) pp. 78–106.

* cited by examiner

Primary Examiner—Edward J. Cain
(74) Attorney, Agent, or Firm—Keil & Weinkauf

(57) ABSTRACT

The invention relates to thermoplastic nanocomposites, comprising
  a) a thermoplastic (A),
  b) at least one compound (B) (delaminated phyllosilicate), whose structure has been built up from negatively charged phyllosilicates and from cations embedded between these, and which have been dispersed uniformly in component (A), and
  c) a rubber or rubber mixtures (C), where component (C) has a particle size distribution with a d(50) value of from 10 to 1000 nm. The invention further relates to a process for preparing these nanocomposites, and also to their use.

10 Claims, 1 Drawing Sheet

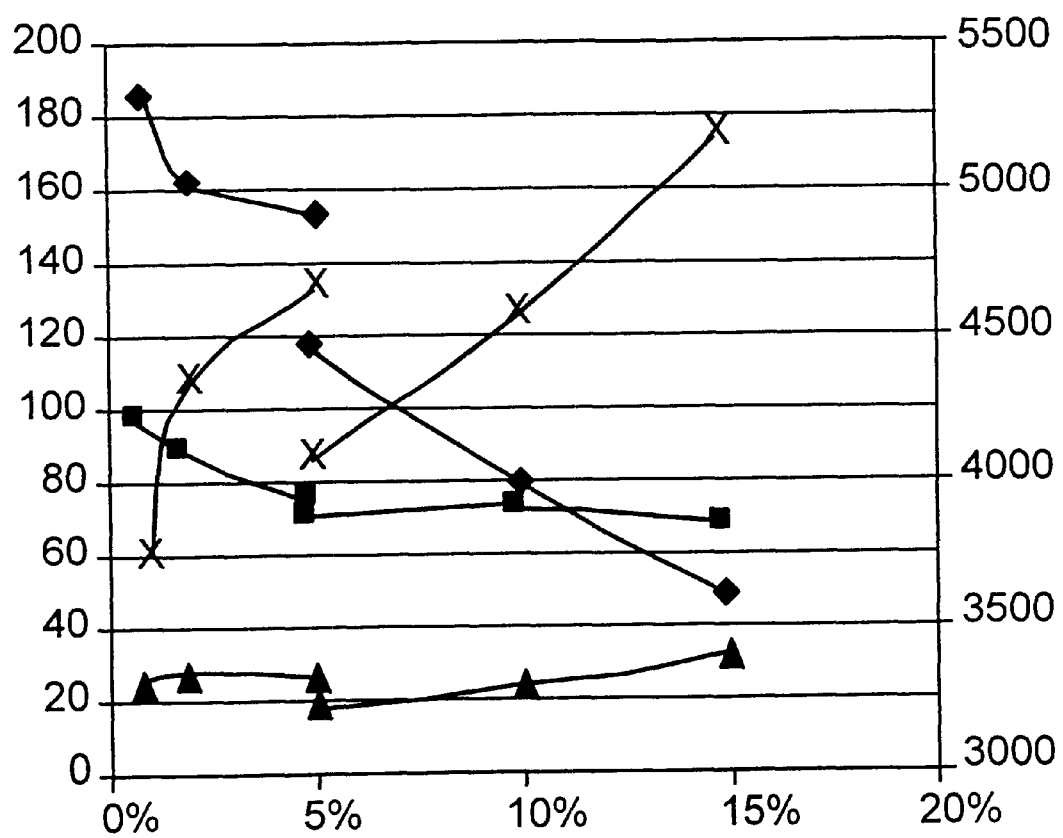

THERMOPLASTIC MATERIALS CONTAINING NANOCOMPOSITES AND AN ADDITIONAL ELASTOMER

The invention relates to thermoplastic nanocomposites with advantageously balanced mechanical properties.

Composite materials made from organic polymers, such as polyamides, and from layer-type silicates are known. These materials have high stiffness. However, while addition of the phyllosilicates improves stiffness it also reduces toughness.

EP-B 0 387 903 therefore proposes the use of impact modifiers in thermoplastic polypropylene resin compositions. The compositions disclosed comprise a modified polypropylene, for example grafted with unsaturated carboxylic acids, and comprise a polyamide modified with clay minerals and also an ethylene-α-olefin copolymer rubber or a derivative thereof and/or a block polymer and/or an inorganic filler. No specific rubber is disclosed for increasing impact resistance.

EP-B 0 352 042 describes a highly rigid and impact-resistance resin mixture made from a polyamide resin composite material which is composed of, alongside a layered silicate, a polyphenyl ether resin and/or a resin which improves impact resistance but is not further defined. The particle sizes of the resin which improves impact resistance are not defined.

It is an object of the present invention to provide thermoplastic nanocomposites with advantageously balanced mechanical properties. These should have improved mechanical and processing properties, in particular excellent stiffness and at the same time excellent toughness.

We have found that this object is achieved by thermoplastic nanocomposites, comprising a) a thermoplastic (A), b) at least one compound (B) (delaminated phyllosilicate), whose structure has been built up from negatively charged phyllosilicates and from cations embedded between these, and which have been dispersed uniformly in component (A), and c) a rubber or rubber mixtures (C), wherein component (C) has a particle size distribution with a d(50) value of from 10 to 1000 nm.

These fine-particle rubbers or rubber mixtures (C) used according to the invention have dimensions similar to those of the phyllosilicates used. The dispersion achieved of the phyllosilicates in the thermoplastic is therefore improved.

This improvement in toughness while retaining stiffness in the novel thermoplastics is surprising, since fine-particled rubbers or rubber mixtures of this type as used according to the invention do not bring about any significant increase in toughness in thermoplastic polymer compositions in which no phyllosilicates are present.

The fine-particle rubbers or rubber mixtures (C) used according to the invention have a particle size distribution with a d(50) value of from 10 to 1000 nm, preferably from 15 to 500 nm, particularly preferably from 20 to 250 nm. The dimensions of these rubber particles therefore correspond to those of delaminated phyllosilicates, which usually have a maximum side length of from 200 nm to 2 $\mu$m and a thickness of from 8 to 100 Å.

The d(50) value here is defined as the value at which 50% by weight of the particles have a diameter greater, and 50% by weight of particles have a diameter smaller than this value.

The proportion of component (C) used, based on the total weight of the thermoplastic nanocomposites, is small. Use is generally made of from 0.1 to 15% by weight, preferably from 1 to 10% by weight and particularly preferably from 2 to 4% by weight, of component (C), based on the total weight of the thermoplastic nanocomposite.

Component (C) is used in the novel thermoplastic nanocomposites to increase impact resistance. No significant impairment, and preferably no impairment at all, of the stiffness or strength of the thermoplastic nanocomposites results from the use of component (C).

The novel thermoplastic nanocomposites preferably comprise a) from 10 to 99.89% by weight of component (A), b) from 0.01 to 15% by weight, preferably from 1 to 12% by weight, particularly preferably from 2 to 7% by weight of component (B), c) from 0.1 to 15% by weight, preferably from 1 to 10% by weight, particularly preferably from 2 to 4% by weight, of component (C), d) from 0 to 50% by weight of other fillers (D), and e) from 0 to 50% by weight of other additives (E), where the total of all of the components is 100% by weight.

Component A: Thermoplastics

The thermoplastics have preferably been selected from the group consisting of polyamides, vinyl polymers, polyesters, polycarbonates, polyaldehydes and polyketones. The thermoplastics are particularly preferably polyamides. Possible polyamide-forming monomers are lactams, such as $\epsilon$-caprolactam, enantholactam, caprylolactam and laurolactam, and also mixtures of these, preferably $\epsilon$-caprolactam. Examples of other polyamide-forming monomers which may be used are dicarboxylic acids, such as alkanedicarboxylic acids having from 6 to 12 carbon atoms, in particular from 6 to 10 carbon atoms, such as adipic acid, pimelic acid, suberic acid, azelaic acid and sebacic acid, and also terephthalic acid and isophthalic acid, diamines, such as $C_4$–$C_{12}$-alkyl diamines, in particular having from 4 to 8 carbon atoms, such as hexamethylenediamine, tetramethylenediamine and octamethylenediamine, and also m-xylylenediamine, bis(4-aminophenyl)methane, 2,2-bis(4-aminophenyl)propane and bis(4-aminocyclo-hexyl)methane, and also mixtures of dicarboxylic acids and diamines in any desired combination within each group but preferably in an equivalent ratio each to the other, for example hexamethylenediammonium adipate, hexamethylenediammonium terephthalate and tetramethylenediammonium adipate, preferably hexamethylenediammonium adipate and hexamethylenediammonium terephthalate. Particular industrial importance is attached to polycaprolactam and polyamides built up from caprolactam, hexamethylenediamine, isophthalic acid and/or terephthalic acid. Monomers suitable for preparing vinyl polymers are ethylene, propylene, butadiene, isoprene, chloroprene, vinyl chloride, vinylidene chloride, vinyl fluoride, vinylidene fluoride, styrene, α-methylstyrene, divinylbenzene, acrylic acid, methacrylate, ethyl acrylate, n-propyl acrylate, isopropyl acrylate, n-butyl acrylate, isobutyl acrylate, tert-butyl acrylate, methacrylic acid, methyl methacrylate, ethyl methacrylate, n-propyl methacrylate, isopropyl methacrylate, n-butyl methacrylate, isobutyl methacrylate, tert-butyl methacrylate, acrylamide, methacrylamide, ethylacrylamide, n-propylacrylamide, isopropylacrylamide, acrylonitrile, vinyl alcohol, norbomadiene, N-vinylcarbazole, vinylpyridine, 1-butene, isobutene, vinylidene cyanide, 4-methyl-1-pentene, vinyl acetate, vinyl isobutyl ether, methyl vinyl ketone, vinyl vinyl ketone, methyl vinyl ether, vinyl vinyl ether, vinyl vinyl sulfide and acrolein. These monomers may be used alone or in combination with one another. Preferred vinyl polymers are polystyrene, in particular syndiotactic polystyrene, polyethylene, polypropylene and polyvinyl chloride.

Polyesters are also suitable thermoplastics, preferably those based on terephthalic acid and diols, particularly preferably polyethylene terephthalate and polybutylene terephthalate.

Other suitable thermoplastics are polycarbonates, polyketones and polyaldehydes, such as polyoxymethylene.

Component B: Phyllosilicates

Phyllosilicates are generally understood to be silicates in which the $SiO_4$ tetrahedra have been bonded in infinite two-dimensional networks. (The empirical formula for the anion is $(Si_2O_5^{2-})_n$. The individual layers having bonding to one another via the cations lying between them, and the cations mostly present in the phyllosilicates which occur naturally are Na, K, Mg, Al or/and Ca.

Examples which should be mentioned of synthetic and naturally occurring phyllosilicates are montmorillonite, smectite, illite, sepiolite, palygorskite, muscovite, allevardite, amesite, hectorite, fluorohectorite, saponite, beidellite, talc, nontronite, stevensite, bentonite, mica, vermiculite, fluorovermiculite, halloysite and fluorine-containing synthetic varieties of talc.

For the purposes of the present invention, a delaminated or hydrophobicized phyllosilicate is a phyllosilicate in which the distances between the layers are initially enlarged by reaction with hydrophobicizers, followed, if appropriate, by addition of monomer (swelling, e.g. with caprolactam).

The layer thicknesses of silicates of this type before delamination are usually from 5 to 100 Å, preferably from 5 to 50 Å and in particular from 8 to 25 Å (distance from the upper boundary of one layer to the upper boundary of the next layer).

The delamination of the layers then takes place by polycondensation or mixing, e.g. by compounding the hydrophobicized and, where appropriate, swollen phyllosilicate with thermoplastics (component A), preferably with polyamides, and the resultant distance between the layers in the thermoplastic nanocomposite is preferably at least 40 Å, particularly preferably at least 50 Å.

To enlarge the distances between the layers (hydrophobicization), the phyllosilicates are reacted (prior to preparing the novel thermoplastic nanocomposites) with hydrophobicizers, often referred to as onium ions or onium salts.

In this, the cations of the phyllosilicates are replaced by organic hydrophobicizers. The desired distances between the layers can be set via the type of organic radical used, and depends on the type of particular monomer or polymer into which the phyllosilicate is to be incorporated.

The exchange of the metal ions may be complete or partial or may not take place at all. Complete exchange of the metal ions is preferred. The amount of exchangeable metal ions is usually given in milliequivalents (meq) per 100 g of phyllosilicate, and referred to as the ion-exchange capacity.

Preference is given to phyllosilicates with a cation-exchange capacity of at least 50 meq/100 g, preferably from 80 to 130 meq/100 g.

Suitable organic hydrophobicizers are derived from oxonium, ammonium, phosphonium or sulfonium ions, which may carry one or more organic radicals.

Suitable hydrophobicizers which may be mentioned are those of the formula I and/or II:

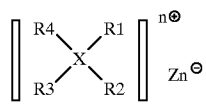

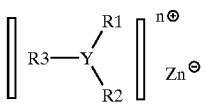

where:

R$^1$, R$^2$, R$^3$ and R$^4$, independently of one another, are hydrogen, a straight-chain or branched, saturated or unsaturated hydrocarbon radical having from 1 to 40 carbon atoms, preferably from 1 to 20 carbon atoms, which may, if desired, carry at least one functional group, or where two of the radicals have bonding to one another, in particular to give a heterocyclic radical having from 5 to 10 carbon atoms, X is phosphorus or nitrogen, Y is oxygen or sulfur, n is an integer from 1 to 5, preferably from 1 to 3, and Z is an anion.

Suitable functional groups are hydroxyl, nitro or sulfo groups, and particularly preferably carboxyl groups, since functional groups of this type give better bonding to the end groups of the polyamide.

Suitable anions Z derive from protonic acids, in particular mineral acids, and preference is given to halogens, such as chlorine, bromine, fluorine or iodine, sulfate, sulfonate, phosphate, phosphonate, phosphite and carboxylate, in particular acetate.

The phyllosilicates used as starting materials are generally reacted in the form of a suspension. The preferred suspension medium is water, if desired in a mixture with alcohols, in particular lower alcohols having from 1 to 3 carbon atoms. It can be advantageous to use a hydrocarbon, for example heptane, together with the aqueous medium, since the hydrophobicized phyllosilicates are usually more compatible with hydrocarbons than with water.

Examples of other suitable suspension media are ketones and hydrocarbons. A water-miscible suspension medium is generally preferred. When the hydrophobicizer is added to the phyllosilicate, an ion exchange takes place, usually resulting in the precipitation of the phyllosilicate from the solution. The metal salt produced as a by-product of the ion exchange is preferably water-soluble, so that the hydrophobicized phyllosilicate can be separated off as a crystalline solid, e.g. by filtration.

The ion exchange is substantially independent of the reaction temperature. The temperature is preferably above the crystallization point of the medium and below its boiling point. In the case of aqueous systems, the temperature is from 0 to 100° C., preferably from 40 to 80° C.

In the case of polyamides as component A, preference is given to alkylammonium ions, which are obtainable in particular by reacting suitable aminocarboxylic acids, preferably ω-aminocarboxylic acids, such as ω-aminododecanoic acid, ω-aminoundecanoic acid, ω-aminobutyric acid, ω-aminocaprylic acid or ω-aminocaproic acid, with the usual mineral acids, such as hydrochloric acid, sulfuric acid or phosphoric acid, or with methylating agents, such as methyl iodide.

Other preferred alkylammonium ions are laurylammonium, myristylammonium, palmitylammonium, stearylammonium, pyridinium, octadecylammonium, monomethyloctadecylammonium and dimethyloctadecylammonium ions.

Examples which may be mentioned of suitable phosphonium ions are docosyltrimethylphosphonium, hexatriacontyltricyclohexylphosphonium, octadecyltriethylphosphonium, eicosyltriisobutylphosphonium, methyltrinonylphosphonium, ethyltrihexadecylphosphonium, dimethyldidecylphosphonium, diethyldioctadecylphosphonium, octadecyldiethylallylphosphonium, trioctylvinylbenzylphosphonium, dioctyldecylethylhydroxyethylphosphonium, docosyldiethyldichlorobenzylphosphonium, octylnonyldecylpropargylphosphonium, triisobutylperfluorodecylphosphonium, eicosyltrihydroxymethylphosphonium, triacontyltriscyanoethylphosphonium, and bis(trioctyl)ethylenediphosphonium.

Other suitable hydrophobicizers are described, for example, in WO 93/4118, WO 93/4117, EP-A 398 551 and DE-A 36 32 865.

Phonium, dioctyldecylethylhydroxyethylphosphonium, docosyldiethyldichlorobenzylphosphonium, octylnonyldecylpropargylphosphonium, triisobutylperfluorodecylphosphonium, eicosyltrihydroxymethylphosphonium, triacontyltriscyanoethylphosphonium, and bis(trioctyl)ethylenediphosphonium.

Other suitable hydrophobicizers are described, for example, in WO 93/4118, WO 93/4117, EP-A 398 551 and DE-A 36 32 865.

After the hydrophobicization, the phyllosilicates generally have a distance between the layers of from 10 to 50 Å, preferably from 13 to 40 Å. The distance between the layers is usually the distance from the lower boundary of the upper layer to the upper boundary of the lower layer.

The phyllosilicate hydrophobicized in the above manner is freed from water as far as is possible, for example by drying, such as spray drying. The hydrophobicized phyllosilicate treated in this way generally comprises from 0 to 10% by weight, preferably from 0 to 5% by weight, of water. The hydrophobicized phyllosilicate may then be used as a suspension in a suspension medium very substantially free from water. Among the suspension media mentioned above, those particularly suitable are the alcohols and the lower-boiling alkanes. Alternatively, the hydrophobicized phyllosilicate may be mixed in solid form with, for example, the polyamide monomers. Preference is given to the use of the hydrophobicized phyllosilicates in solid form.

It is possible here to increase further the distance between the layers by reacting (swelling) the phyllosilicate with polyamide monomers, for example at from 25 to 300° C., preferably from 80 to 280° C., and in particular from 80 to 260° C., for a residence time of generally from 5 to 120 min, preferably from 10 to 60 min. Depending on the length of the residence time and the type of monomer selected, the distance between the layers is further increased by from 10 to 150 Å, preferably by from 10 to 50 Å. The length of the laminae is usually up to 2000 Å, preferably up to 1500 Å. Any prepolymers which are present or which form generally also contribute to swelling of the phyllosilicates.

Component C: Rubber or Rubber Mixtures

According to the invention use is made of a rubber with at least one phase (e.g. core, intermediate shell or outer shell) with a glass transition temperature $T_g$<0° C., preferably <−10° C., particularly preferably <−15°C. (soft phase). Examples of rubbers of this type are polybutadiene, polyisoprene and their derivatives, polysiloxanes, poly(meth)acrylates, and copolymers of polyethylene and of polypropylene, such as EPDM (ethylene-propylene-diene terpolymer) rubbers. These rubbers may contain other monomer units, the polymers built up from which have a glass transition temperature $T_g$>0° C. Examples of these are styrene, (meth)acrylonitrile, and also (meth)acrylates. Other comonomer units which may be used are units having reactive groups, for example (meth)acrylic acid, other carboxylic acids and derivatives of these. Examples of these are (meth)acrylic acid, tert-butyl acrylate, glycidyl(meth)acrylate and (meth)acrylamide.

This rubbery phase may be the only phase, but it is preferable to use rubbers whose particles have two or more phases. It is particularly preferable for one of these phases to have a glass transition temperature $T_g$>0° C. (hard phase). Examples of monomers which may be used for the hard phase are esters of (meth)acrylic acid and other carboxylic acids and derivatives of these, styrene and acrylonitrile. These phases may also contain monomers having reactive groups, e.g. (meth)acrylic acid, tert-butyl acrylate, glycidyl (meth)acrylate and (meth)acrylamide.

A typical particle structure for the preferred rubbers having two or more phases is a core with one or more shells, where the rubber phase or rubber phases may be a core or outer shells or intermediate shells (core-shell rubber).

The rubbers used according to the invention are usually prepared by emulsion polymerization, as described, for example, in Emulsion Polymerization and Emulsion Polymers, edited by P. Lovel and M. El-Aasser, John Wiley and Sons, 1997 and Encyclopaedia of Polymer Science and Engineering, Vol. 6, John Wiley and Sons, 1986. Once the rubbers according to the invention have been prepared they have a particulate morphology.

For the purposes of the invention, a core-shell rubber is a particle in which, during emulsion polymerization, a first monomer or a first monomer mixture (core) is polymerized. During, or at the end of, this polymerization step other monomers or monomer mixtures are added to the reaction ($1^{st}$ shell) and the polymerization continues. This procedure may be repeated two or more times if desired (further shells). In this way polymer particles with different phases are built.

Any of the phases may contain crosslinking agents or graft monomers. Examples of these are divinylbenzene, allyl(meth)acrylate, butanediol diacrylate and dihydrodicyclopentadienyl acrylate. The amount of these crosslinking agents or graft monomers used is generally from 0 to 10% by weight, preferably from 0.2 to 6% by weight, particulary preferably from 0.5 to 4% by weight, based on the monomers in the respective phase.

Component (C) preferably comprises a rubber phase or rubber phases (soft phase) containing more than 50% by weight, preferably more than 60% by weight, particularly preferably more than 75% by weight, of polybutadiene units or polybutyl units or ethylhexyl acrylate units, and a hard phase or hard phases, comprising more than 70% by weight, preferably more than 80% by weight, particularly preferably more than 85% by weight, of monomer units made from methyl methacrylate, styrene or acrylonitrile, where the hard phase may contain an amount of generally up to 30% by weight, preferably up to 20% by weight, particularly preferably up to 15% by weight, of tert-butyl acrylate or (meth)acrylic acid.

The rubbers used according to the invention have a defined particle size distribution with a d(50) value of from 10 to 1000 nm. Preference is given to a d(50) value of from 15 to 500 nm, particularly preferably from 20 to 250 nm.

Rubbers prepared in emulsions of polyamide as preferred component (A) are described, for example, in EP-A 0 125 483, EP-A 0 001 245 and EP-A 0 083 446.

Component (D): Fillers

Suitable fillers are particulate or fibrous fillers. Suitable particulate fillers are carbonates, such as magnesium carbonate or chalk. Preference is given to the use of fibrous fillers. Examples of suitable fibrous fillers are carbon fibers, potassium titanate whiskers, aramid fibers and glass fibers. Particular preference is given to using glass fibers. If glass fibers are used these may have been provided with a size or with a coupling agent to improve compatibility with the matrix material. The carbon fibers and glass fibers used generally have a diameter of from 6 to 20 μm. The glass fibers may be incorporated either as short glass fibers or else as continuous strands (rovings). Carbon fibers or glass fibers may also be used in the form of fabrics, mats or glass-filament rovings. The amounts of the fillers present may generally be from 0 to 50% by weight, preferably from 15 to 40% by weight, particularly preferably from 20 to 35% by weight, based on the total weight of the compositions.

Component (E): Additives

The compositions may, furthermore, comprise additives. Examples of these additives are processing aids, stabilizers and oxidation retarders, agents to inhibit decomposition by heat or by ultraviolet light, lubricants, mold-release agents, flame retardants, dyes, pigments and plasticizers. The proportion of these is generally from 0 to 50% by weight, preferably up to 30% by weight, particularly preferably from 1 to 25% by weight, based on the total weight of the composition.

The amounts of pigments and dyes used are generally from 0 to 4% by weight, preferably from 0.5 to 3.5% by weight and particularly preferably from 0.5 to 3% by weight, based on the total weight of compositions.

The pigments for pigmentation of thermoplastics are well known, see, for example, R. Gächter and H. Müller, Taschenbuch der Kunststoffadditive, Carl Hanser Verlag, 1983, pp. 494–510. The first preferred group of pigments which should be mentioned is that of white pigments, such as zinc oxide, zinc sulfide, white lead ($2\ PbCO_3.Pb(OH)_2$), lithopones, antimony white and titanium dioxide. Of the two most common crystalline forms of titanium dioxide (rutile and anatase) it is in particular the rutile form which is used for white coloration of the novel thermoplastic nanocomposites.

Black color pigments which may be used according to the invention are iron oxide black ($Fe_3O_4$), spinel black ($Cu(Cr, Fe)_2O_4$), manganese black (a mixture of manganese dioxide, silicon dioxide and iron oxide), cobalt black and antimony black, and also particularly preferably carbon black, which is used mostly in the form of furnace black or gas black (see in this connection G. Benzing, Pigmente fur Anstrichmittel, Expert-Verlag (1988), pp. 78 et seq.).

To achieve particular color shades it is, of course, also possible according to the invention to use inorganic pigments, such as chromium oxide green, or organic color pigments, such as azo pigments and phthalocyanines. Pigments of this type are widely commercially available.

It can also be advantageous to use mixtures of the pigments and, respectively, dyes mentioned, e.g. carbon black with copper phthalocyanines, since this generally makes it easier to disperse the color in the thermoplastic.

Examples of oxidation retarders and heat stabilizers which according to the invention may be added to the thermoplastic materials are halides of metals of group I of the periodic table, e.g. sodium halides, potassium halides and lithium halides, if desired combined with copper(I) halides, e.g. chlorides, bromides or iodides. The halides, in particular of copper, may also contain electron-rich π-ligands. Examples which may be mentioned of copper complexes of this type are Cu-halide complexes with, for example, triphenylphosphine. It is also possible to use zinc fluoride and zinc chloride. Use may moreover be made of sterically hindered phenols, hydroquinones, substituted representatives of this group, secondary aromatic amines, if desired combined with phosphorus-containing acids or, respectively, with salts of these, or mixtures of these compounds, generally in concentrations of up to 1% by weight, based on the weight of the mixture.

Examples of UV stabilizers are various substituted resorcinols, salicylates, benzotriazoles and benzophenones, usually used in amounts of up to 2% by weight.

Lubricants and mold-release agents, which are usually used in amounts of up to 1% by weight of the thermoplastic material, are stearic acid, stearyl alcohol, alkyl stearates and stearamides, and also esters of pentaerythritol and long-chain fatty acids. It is also possible to use stearates of calcium, of zinc or of aluminum, or else dialkyl ketones, e.g. distearyl ketone.

Processes for Preparing the Novel Thermoplastic Nanocomposites

There are various ways of preparing the novel thermoplastic nanocomposites.

1. In-situ Method

In the in-situ method, the hydrophobicized phyllosilicate (B) (e.g. Cloisite 30A® from Southern Clay Products, Laporte Co., England) is mixed, in suspension or as a solid, with the monomers polymerizable to give the thermoplastic (A). Swelling of the hydrophobicized phyllosilicate with the monomers then takes place. The polymerization of the monomers which follows may be carried out in a usual manner. The resultant nanocomposites are then compounded with component (C) and, if desired, with other components (D) and (E).

For this, the monomers polymerizable to give component (A) (thermplastic) are added to the hydrophobicized phyllosilicates (B) suspended in a solvent, preferably in an alcohol, particularly preferably in methanol, and polymerized in the presence of generally from 0.1 to 8% by weight, preferably from 0.1 to 7% by weight, of water, based on the monomers. The polymerization is preferably carried out in the presence of more than 0.2% by weight of water, for example from 0.25 to 6% by weight of water. Preferred amounts of water are from 0.3 to 5% by weight, in particular from 0.5 to 5% by weight, for example from 0.3 to 4.5% by weight, based on the monomers. These conditions give an adequately high polymerization rate.

The water may be added to the suspension. If these suspensions already comprise water, either no further water is added or the amount of water added is only that needed for the total amount of water, based on the monomers, to be within the range according to the invention.

To achieve very good and thorough mixing, the suspension is advantageously stirred, particularly preferably with high shear. Stirred tank reactors, for example, are suitable for this purpose. The water is then generally added all at once, little by little or continuously, while the temperature of the suspension is generally from 70 to 100° C., preferably from 75 to 95° C. The temperature of the aqueous suspension is increased, either at the same time or subsequently, generally as far as from 180 to 330° C., preferably from 220 to 320° C. The suspension may either remain in the apparatus in which it has been prepared, or it may be transferred into another reaction vessel, prior to or after the temperature increase, or prior to or after the addition of water. It is particularly advantageous to carry out the polymerization with simultaneous application of shear. Shear stresses to DIN 11 443 of from 10 to $10^5$ Pa, in particular from $10^2$ to $10^4$ Pa, are preferred for this purpose.

It is possible to use various methods of conducting the process for preparing the novel compositions. For example, the preparation may take place by a batchwise or continuous process.

In the batchwise process, the aqueous suspension may be polymerized under the abovementioned conditions of temperature and shear, and under pressure. The pressure here is generally from 5 to 30 bar, preferably from 8 to 20 bar (absolute). The residence times here are substantially dependent on the temperature selected during the polymerization and are generally from 0.5 to 3 h. After equilibrium conversion has been reached, the water is generally evaporated and the pressure reduced to atmospheric pressure. Any water still present in the melt can cause further build-up of molecular weight, even at this pressure. The reaction mixture is then discharged, for example as shaped strips of melt, cooled, expediently by passing through a water bath, and comminuted, preferably pelletized. The resultant polyamides generally have molar masses of up to 22,000 g/mol, preferably from 8000 to 22,000 g/mol.

In a preferred embodiment, the continuous process is generally carried out by feeding the aqueous suspension, whose temperature is from 70 to 100° C., preferably from 75 to 95° C., continuously to a first reaction zone and polymerizing the same there under the abovementioned conditions of temperature and shear. In a particularly preferred embodiment, prepolymers of other, or of the same, monomers may be fed, as well as the aqueous suspension, to the first reaction zone. These may derive from the extraction of pelletized product (see below). The pressure in the first reaction zone is generally less than 5 bar (absolute), for example from 1 to 3 bar (absolute).

The residence time, which depends substantially on the temperature, pressure and water content of the reaction mixture, is generally selected to be from 2 to 5 h, preferably from 3 to 4 h. If prepolymers are fed into the first stage of the reaction, the residence times are generally shorter than 2 h, preferably from 0.5 to 1 h. When caprolactam is used, polycondensation in the first reaction zone is usually to a molar mass of 3000 g/mol or greater, preferably from 5000 to 7000 g/mol. The total end group concentration here may, for example, be from 200 to 600 mmol/kg, preferably from 300 to 400 mmol/kg.

The reaction mixture is passed from the first reaction zone into a second reaction zone. The reaction vessel of the second reaction zone may, for example, be tube-shaped, and is preferably equipped with internals. These include ordered mixing elements, such as packings (e.g. Raschig rings, beads or Pall rings) so as preferably to ensure a minimum period of residence of the as yet unreacted monomers in the melt (in order to achieve a high degree of conversion) and to avoid, to a very substantial extent, zones in which no, or only minimal transport of the melt takes place ("dead zones"), and also to avoid any back-mixing. The temperatures in the second reaction zone are generally within the same range as those in the first reaction zone. The residence time in the second reaction zone may vary within wide limits, depending on the type of monomer, the temperature, the pressure and the nature of the reaction vessel. The residence time in the second reaction zone is generally longer if no prepolymer has been added in the first reaction zone. The polymer melt is generally discharged from the second reaction zone in the form of shaped strands of melt, cooled using a water bath and comminuted, preferably pelletized. Polyamides obtained in this way may, for example, have molar masses of from 12,000 to 22,000 g/mol.

The compositions obtained from the batchwise process, and also those from the continuous process, may also comprise volatile constituents, such as the lactam used (for example in caprolactam polymerization) and other monomer units, and also steam-volatile oligomers. These are generally removed from the polymer granules by countercurrent extraction with water (see, for example, DE-A 206999). Another way to do this is gas-phase extraction (see EP-A 0 284 968) with, at the same time, build-up of molecular weight, and in this extraction superheated steam may be used for simultaneous extraction and annealing. In a preferred embodiment, the volatile constituents are reintroduced quantitatively into the process, i.e. preferably into the first reaction zone. To this end, the concentration in the extraction water is preferably increased to an extract content of not more than 85% by weight, and the water content of the concentrate obtained is adjusted by adding fresh monomers in such a way that the polycondensation can be carried out in the presence of the amount of water according to the invention. If the polymerization is carried out in this way, at least one adiabatic release of pressure is generally brought about during the polymerization in order to reduce the water content (see DE-A-19 752 181).

The desired viscosity number of the final product may also be adjusted in a known manner by drying, or by polymerization during annealing in the solid phase.

The desired viscosity number of the final product here is generally from 80 to 350 ml/g, preferably 120 to 200 ml/g (measured on a 0.5% strength by weight solution in 95% strength by weight sulfuric acid after removing insoluble constituents).

The resultant nanocomposites are compounded with component (C) (rubber or rubber mixtures) and, if desired, with other components (D) and (E), by conventional processes, e.g. using extrusion.

The compositions prepared by the novel process generally comprise from 10 to 99.89% by weight, based on the total weight of the compositions, of thermoplastic (component A) and from 0.1 to 15% by weight, preferably from 1 to 10% by weight, particularly preferably from 2 to 4% by weight, based on the total weight of the compositions, of rubber or rubber mixtures (component C). The proportion of the delaminated phyllosilicates (component B) is generally from 0.01 to 15% by weight, preferably from 1 to 12% by weight, particularly preferably from 4 to 10% by weight, based on the total weight of the compositions. The proportion of component B here is determined by ashing the compositions.

2. Melt Intercalation

In another preferred embodiment the novel thermoplastic nanocomposites may be obtained by mixing the thermoplastic (component A), the hydrophobicized phyllosilicate (component B) and the rubber or rubber mixtures (component C) by well known processes, e.g. using extrusion at from 160 to 260° C., particularly preferably from 240 to 260° C. A twin-screw extruder with high shear is preferably suitable for this.

In both routes component C may be added wet (in the form of an emulsion) or dry. If component C is added dry, the drying may be by gravity-assisted or spray-drying methods.

The resultant novel thermoplastic nanocomposites have, in particular, excellent toughness together with very good stiffness.

The novel thermoplastic nanocomposites may be used to produce moldings. Moldings of this type may preferably be produced by extrusion, thermoforming or injection molding.

The present invention therefore further provides moldings obtainable using the novel nanocomposites.

FIG. 1 shows a comparison of the breaking stress in MPa (squares), yield elongation×10 in % (triangles), Charpy 1 eU notched impact strength in kJ/m$^2$ (crosses) and modulus of elasticity in MPa (diamonds) of thermoplastic nanocomposites with Cloisite 30 A® (from Southern Clay Products, Laporte Co., England) as component B. These have been modified with a) a conventional impact modifier (Lupolen® KR 1270 BASF AG, particle size: ≦1 μm) and, respectively, b) an emulsion rubber (component C) (particle size: 40 nm) used according to the invention.

The abscissa gives the required proportion of the respective impact modifier, based on the total weight of the thermoplastic nanocomposite.

The left-hand ordinate gives the breaking stress in MPa and the impact resistance in kJ/m$^2$ and the right-hand ordinate gives the modulus of elasticity in MPa.

It is clear from FIG. 1 that a smaller proportion of the rubber used according to the invention with a small, defined particle size (component C) than of a conventional impact modifier with larger particle size (see: right-hand section of FIG. 1) is needed to achieve good overall properties in the thermoplastic nanocomposite (see: left-hand section of FIG. 1).

The precise values for breaking stress, elongation at yield, notched impact strength and modulus of elasticity are given in the table below.

The following examples further describe the invention.

EXAMPLES

Component B

Cloisite 30 A® (Southern Clay Products, Laporte Co., England) (previously hydrophobicized phyllosilicate)

Preparation of Component C

The following materials were charged to a flask under nitrogen, with stirring:

3588.1 g of water 472.5 g of a 40% strength solution of a sodium salt of a $C_{12}$–$C_{18}$ paraffinsulfonic acid in water 5.7 g of potassium persulfate and heated to 65° C. 250 ml of Feed 1 were added and polymerization was begun for 10 minutes, and the remainder of Feed 1 was fed during 190 minutes and polymerization completed in 60 minutes.

Feed 1

1852.2 g of n-butyl acrylate 37.8 g of dihydrodicyclopentadienyl acrylate

To this dispersion were added, at 65° C., 1257.3 g of water and 2.0 g of potassium persulfate, followed by Feed 2, in a total of 50 minutes. Polymerization was then completed in 60 minutes.

Feed 2

573.8 g of methyl methacrylate 101.2 g of tert-butyl acrylate

The following were then added 251.5 g of water 0.4 g of potassium persulfate followed by a feed made from 126.9 g of methyl methacrylate and 8.1 g of methacrylic acid over a period of 20 minutes. After this, a further polymerization reaction was carried out for 105 minutes at 65° C.

The dispersion was frozen out at −20° C., filtered off with suction, washed and dried at 40° C. in vacuo.

Preparation of the Novel Thermoplastic Nanocomposites

ROUTE I

Examples 1 to 3

Preparation of a Nylon-6 Nanocomposite (Preparation of Component A in the Presence of Component B)

3 kg of the polymer A and 0.9 kg of the phyllosilicate B were dissolved or, respectively, suspended in 28 kg of caprolactam. After addition of 1000 g of water the mixture was heated in a stirred-tank reactor to 250° C., the internal pressure being 10 bar. After precondensation for 2 hours the pressure in the vessel was reduced over a period of 1.5 hours, followed by postcondensation for 2.5 hours at 250° C.

The amount was then discharged from the reactor and pelletized. The pellets were extracted with hot water. Compounding the nylon-6 nanocomposite with component C.

Comparative Examples 1 to 3

Lupolen KR 1270 Instead of Component C

ROUTE II

Example 4: One-step Process a) Hydrophobicization

A suspension of 4 l of analytical grade methanol, 80 g of montmorillonite, 20 g (0.14 mol) of di-2-hydroxyethylmethylstearylamine and 26.6 g (0.14 mol) of p-toluenesulfonic acid monohydrate is prepared in a 10 l pressure vessel equipped with a stirrer, stirred vigorously at 75° C. under an $N_2$ atmosphere for 6 h, and then cooled to room temperature.

b) Polymerization

Caprolactam was polymerized in the presence of component B and component C.

Comparative Example 4

Lupolen KR 1270 Instead of Component C

ROUTE III

Example 5

Compounding of all starting materials (ZSK 30) at 260° C. under conventional conditions.

Comparative Example 5

As Example 5, but Lupolen KR 1270

Performance Testing:

The viscosity number of the matrix was determined on 0.5% strength by weight solutions in sulfuric acid at 23° C.

The modulus of elasticity [N/mm$^2$] was determined to DIN 53457.

The melt volume index (MVI) was determined at 275° C. with a load of 5 kg.

Impact resistances ($a_n$[kJ/m$^2$]) were measured on ISO specimens without notches to ISO 179 Part I.

The results are given in Table 1.

TABLE I

| Property | Unit | Test specification | Example 1 | Example 2 | Example 3 | 1c | 2c | 3c | 4 | 4c | 5 | 5c |
|---|---|---|---|---|---|---|---|---|---|---|---|---|
| Viscosity number of matrix | ml/g | | 143 | 143 | 142 | 146 | 148 | 147 | 135 | 133 | 138 | 139 |
| Content of mineral | % | after ashing | 3.7 | 3.6 | 3.5 | 3.5 | 3.7 | 3.8 | 317 | 3.8 | 3.5 | 3.6 |
| Content of impact modifier | % | | 1% 1067/157 | 2% 1067/157 | 5% 1067/157 | 5% KR 1270 | 10% KR 1270 | 15% KR 1270 | 3% 1067/157 | 3% KR 1270 | 5% 1067/157 | 5% KR 1270 |
| Tensile modulus of elasticity | Gpa | ISO 527-2 | 5332 | 5044 | 4938 | 4484 | 4009 | 3607 | 5420 | 5410 | 4310 | 4270 |
| Elongation at break | % | ISO 527-2 | 2.6(B) | 2.9 | 2.8 | 1.9(B) | 2.5(B) | 3.2 | 2.9 | 1.8(B) | 3.2 | 2.6 |
| Breaking strength | MPa | ISO 527-2 | 98 | 89 | 74 | 71 | 73 | 68 | 84 | 77 | 75 | 69 |
| Melt index 275/5 | g/10 min | ISO 1133 | 69.7 | 29.3 | 3.3 | 40.9 | 13.0 | 8.7 | 32.0 | 21.2 | 13.3 | 34.2 |
| Charpy leU impact resistance | kj/m² | ISO 179/leU | 59 | 107 | 134 | 86 | 127 | 174 | 112 | 72 | 143 | 82 |

(B) Brittle fracture

We claim:

1. A thermoplastic nanocomposite, comprising
   a) a thermoplastic (A),
   b) at least one compound (B) (delaminated phyllosilicate), whose structure has been built up from negatively charged phyllosilicates and from cations embedded between these, and which have been dispersed uniformly in component (A), and
   c) a rubber or rubber mixtures (C),
   wherein component (C) has a particle size distribution with a d(50) value of from 15 to 500 nm and the proportion of component (C) present is from 1 to 10% by weight of the total weight.

2. A thermoplastic nanocomposite as claimed in claim 1, comprising
   a) from 10 to 99.89% by weight of component (A),
   b) from 0.01 to 15% by weight of component (B),
   c) from 1 to 10% by weight of component (C),
   d) from 0 to 50% by weight of other fillers (D), and
   e) from 0 to 50% by weight of other additives (E),
   where the total of all of the components is 100% by weight.

3. A thermoplastic nanocomposite as claimed in claim 1, wherein component (A) is a polyamide.

4. A thermoplastic nanocomposite as claimed in claim 1, wherein component (C) is a rubber or a rubber mixture with at least one phase with a glass transition temperature $T_g<0°$ C.

5. A thermoplastic nanocomposite as claimed in claim 4, wherein component (C) is a core-shell rubber.

6. A thermoplastic nanocomposite as claimed in claim 1, wherein component (A) is a polyamide and component (C) is a rubber especially a core-shell rubber or a rubber mixture with at least one phase with a glass transition temperature $T_g<0°$ C.

7. A process for preparing thermoplastic nanocomposites as claimed in claim 1, which comprises repairing the same by an in-situ method in which the delaminated phyllosilicate (B) is mixed, in suspension or as a solid, with the monomers polymerizable to give the thermoplastic (A), the delaminated phyllosilicate (B) is welled with the monomers, the polymerization of the monomers is then carried out in a usual manner and the resultant nanocomposites are compounded with component (C) and, if desired, with other fillers (D) and other additives (E).

8. A process for preparing thermoplastic nanocomposites as claimed in claim 1, wherein the preparation takes place by melt intercalation, where the thermoplastic (component A), the delaminated phyllosilicate (component B) and the rubber or rubber mixtures (component C), and also, if desired, fillers (D) and additives (E), are mixed by well known processes.

9. A process for producing moldings from thermoplastic nanocomposites as claimed in claim 1 by extrusion, thermoforming or injection molding.

10. A molding obtainable by using thermoplastic nanocomposites as claimed in claim 1.

* * * * *